May 17, 1938.  R. J. KALBREIER  2,117,963
SPEED CONTROL
Filed Aug. 6, 1936  2 Sheets-Sheet 1

Robert J. Kalbreier,
INVENTOR
BY Victor J. Evans & Co.
ATTORNEYS

May 17, 1938.　　R. J. KALBREIER　　2,117,963
SPEED CONTROL
Filed Aug. 6, 1936　　2 Sheets-Sheet 2
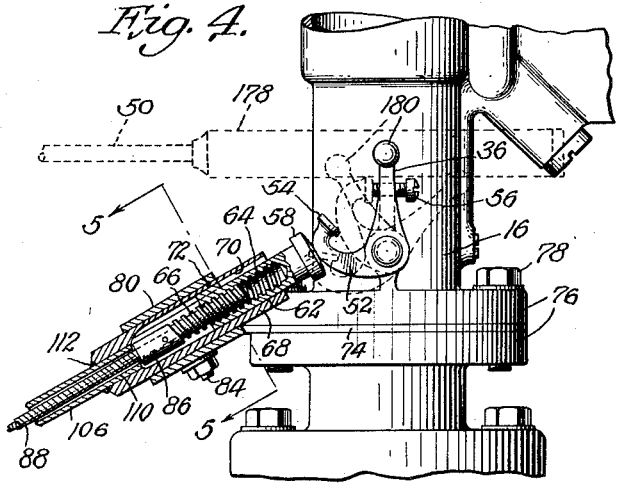
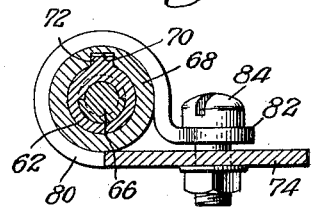
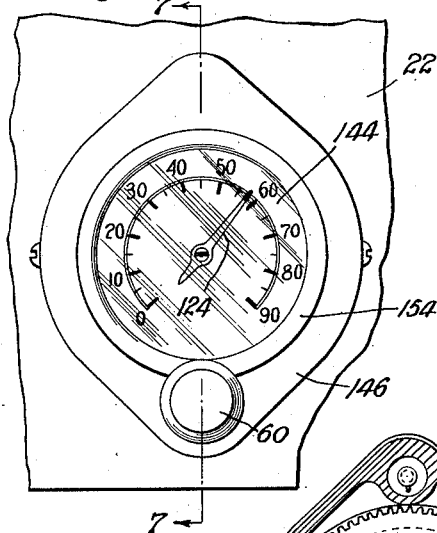
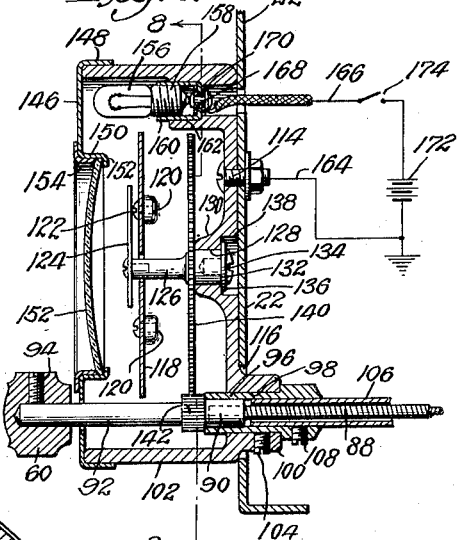
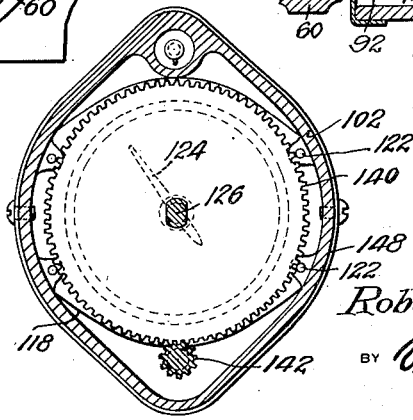
Robert J. Kalbreier,
INVENTOR
BY Victor J. Evans & Co.
ATTORNEYS Patented May 17, 1938

2,117,963

UNITED STATES PATENT OFFICE 2,117,963

SPEED CONTROL

Robert J. Kalbreier, Chicago, Ill.

Application August 6, 1936, Serial No. 94,664

6 Claims. (Cl. 137—139)

My invention relates to internal combustion engines of the type employed in automotive vehicles, and includes among its objects and advantages the provision of an improved speed control.

In the accompanying drawings:

Fig. 4 is a sectional view along the line 4—4 of Fig. 3;

Fig. 5 is a sectional view along the line 5—5 of Fig. 4;

Fig. 6 is an elevational view of the speed indicating dial;

Fig. 7 is a sectional view along the line 7—7 of Fig. 6; and

Fig. 8 is a sectional view along the line 8—8 of Fig. 7.

Figure 1:
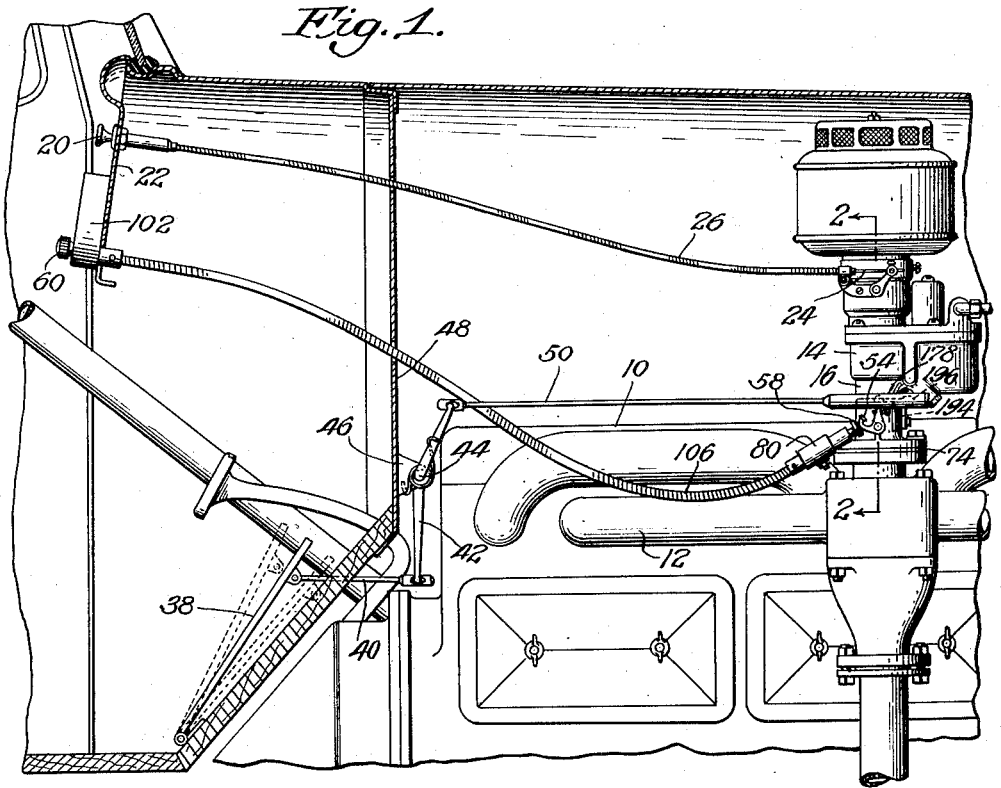
Fig. 1 is a side elevation of a portion of an engine showing my invention applied thereto.
Figure 2:
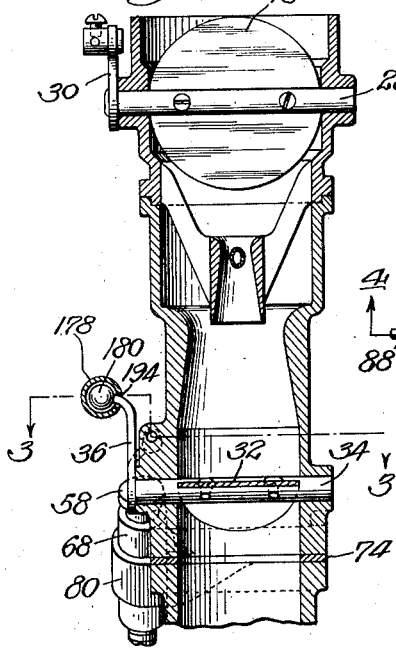
Fig. 2 is a sectional view along the line 2—2 of Fig. 1.

In the embodiment selected to illustrate my invention, I make use of an automotive vehicle engine 10 including the usual intake manifold 12, carburetor 14 and the conduit connection 16 between the carburetor and the intake manifold. The carburetor 14 is provided with the usual choke valve 18 operated through the medium of a button 20 supported on the instrument panel 22. This button is connected with a wire 24 enclosed within a flexible housing 26. Choke valve 18 is supported by a rotatably mounted shaft 28 having an arm 30 fixedly connected with one end thereof. This arm is in turn connected with the wire 24. The structure so far described is conventional.

A throttle valve 32 is mounted on a rotatable shaft 34, which shaft is fixedly connected with an arm 36. Arm 36 is operatively connected with the accelerator pedal 38 through the medium of a link 40 movably connected with a lever 42 pivotally connected at 44 upon a bracket 46 mounted on the wall 48. The opposite end of the lever 42 is movably connected with a link 50, which in turn is connected with the arm 36 for operating the throttle valve.

Figure 3:
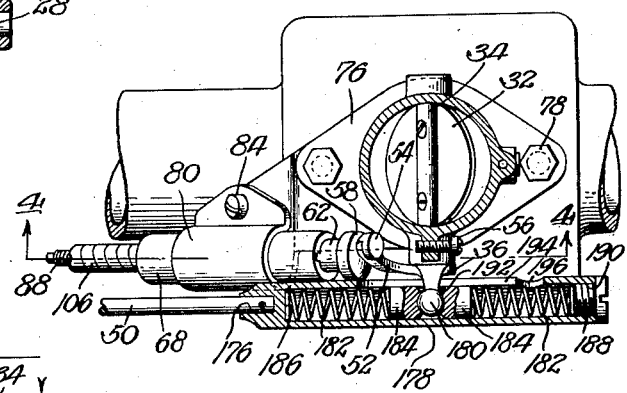
Fig. 3 is a sectional view along the line 3—3 of Fig. 2.

I provide means for limiting the opening movement of the valve 32, which means may be adjusted for limiting the speed of the engine. Referring to Figs. 1, 3, and 4, the arm 36 is integrally connected with a stop arm 52 which includes a head 54 arranged in operative relation with the set screw 56, which screw may be adjusted to determine the throttling position of the valve 32.

I arrange an abutment 58 in the path of the arm 52 for limiting the opening movement of the valve 32. Abutment 58 may be adjusted through the medium of a knob 60 carried by the instrument panel 22 for varying the maximum speed of the engine.

In Fig. 4, the abutment 58 includes a tubular part 62 having internal threads 64 which have threaded relation with a screw 66. The part 62 is slidably mounted within a tubular support 68 having a groove 70 for receiving the key 72 carried by the part 62. The key 72 restrains the part 62 from rotary movement, but permits the member to move longitudinally of the support 68 when the screw 66 is turned. To mount the support 68 I position a bracket 74 between the flanges 76 of the conduit 16. These flanges are pressed against the bracket 74 by bolts 78. The bracket 74 terminates in a strap 80 which is bent about the support 68, and the end of the strap is bent to provide a reach 82 arranged in slightly spaced relation with the bracket 74. Aligned openings are provided in the reach 82 and the bracket 74 for the reception of a bolt 84 which draws the strap 80 firmly about the support 68 for fixedly supporting the latter.

One end of the screw 66 includes a socket 86 within which I fixedly anchor one end of the flexible element 88 which is operatively connected with the knob 60. The element 88 comprises two coiled wire members, one arranged within the other and coiled in opposite directions. Such devices are well known in the art. Referring to Fig. 7, the opposite end of the member 88 is fixedly anchored within a socket 90 carried by one end of the shaft 92 upon which the knob 60 is fixedly connected by a set screw 94. I rotatably mount the socket 90 within a tubular member 96 fixedly connected within the bore 98 in the boss 100 carried by the housing 102. The set screw 104 anchors the tubular member 96. The element 88 is enclosed within a coiled tubular member 106 which has one end fixedly connected within the tubular member 96 by a set screw 108 and its other end fixedly connected within the bore 110 of the support 68. I weld the member 106 to the support 68, as indicated at 112.

I connect the housing 102 with the instrument panel 22 by a bolt 114. An opening 116 in the housing 102 accommodates the boss 100. Within the housing 102 I mount a dial 118 which is fixedly connected with lugs 120 projecting inwardly of the housing by screws 122. I arrange a needle 124 in indicating relation with the dial 118, which needle is fixedly connected with a shaft 126 rotatably mounted within the bore 128 of the boss 130 carried by the housing 120. I enlarge the shaft 126 at 132 and provide this part with a threaded opening for the reception of a screw 134 which passes through a washer 136 which extends over the ledge 138 to prevent axial shifting of the shaft 126 in one direction. Axial shifting of the shaft in the opposite direction is prevented by a gear 140 fixedly mounted on the shaft 126 and having geared relation with a pinion 142 fixedly mounted on the shaft 92. Thus, it will be seen that rotation of the knob 60 imparts rotary movement to the shaft 126 which shifts the needle with respect to the dial reading 144 on the dial 118. Rotation of the shaft 92 imparts rotary motion to the screw 66 which changes the abutting relation between the abutment 58 and the arm 52.

The dial reading 144 may be in terms of miles per hour for the vehicle with the ratio of the fears 140 and 142 proportioned such that the position of the abutment 58 will limit the speed to the reading indicated by the needle 124.

I provide the housing 102 with a cover 146 which includes a flange 148 arranged to frictionally embrace the side walls of the housing. This cover is provided with a flange 150 defining a sight opening, which sight opening is closed by a glass 152. The periphery of the glass fits snugly within the flange 150 and lies against the retaining flange 152 and is held in assembled relation with the flanges 150 and 152 by a bezel 154 which is pressed into the flange 150.

Within the housing 102 I mount an electric bulb 156 for illuminating the dial 118. The threaded part 158 of the bulb is carried by a socket 160 having threaded relation with the bore 162 in the housing. A wire 164 is connected with the screw 114 which has electrical contact with the housing 102. A second wire 166 is electrically connected with a contact 168 carried by the socket 160 and insulated therefrom, as indicated at 170. The source of current for the bulb 156 is indicated at 172. The wire 166 is provided with a switch 174 for opening and closing the socket through the bulb 156. I position the bulb 156 above the glass 152 so that the cover 146 shades the bulb from the eyes of the driver and other occupants of the car, but the position of the bulb is such as to effectively illuminate the dial 118.

When the accelerator pedal 38 is depressed, the valve 32 is moved in an opening direction and is limited only by reason of the abutment 58. Link 50 is fixedly connected within a bore 176 in a tubular member 178 which is connected with the ball 180 carried by the arm 36 for imparting rotary motion to the shaft 34. Within the tubular member 178 I mount two springs 182 which urge blocks 184 against the ball 180. One of the springs 182 has abutting relation with the bottom 186 of the tubular member 178, while the other spring 182 has abutting relation with a plug 188 having threaded relation at 190 with the open end of the tubular member. These springs are under compression when assembled within the tubular member 178 so that the arm 36 will be oscillated when the link 50 is moved through the medium of the accelerator pedal 38.

The blocks 184 are recessed at 192 to partly embrace the ball 180 so as to be held in connected relation therewith because of the spring tension. I slot the tubular member 178 at 194 for freely receiving the arm 36. This slot has one end terminating in an opening 196 of sufficient diameter to receive the ball 180 for assembly purposes. Normal shifting of the ball 180 within the tubular member 178 remains short of the opening 196. The tension of the springs 182 effectively hold the parts together when assembled according to Fig. 3.

The springs 182 perform a cushioning function so as to prevent damage to the arms 36 or 52 in case of abnormal forces on the link 50 through the medium of the pedal 38. The slot 194 is of sufficient length to accommodate relative shifting of the tubular member 178 with respect to the arm 36 in case of abnormal forces on the accelerator pedal 38 after the arm 52 has engaged the fixed abutment 58.

My invention is designed for association with carburetors of conventional design and may be attached thereto without necessitating reconstuction of the carburetor. The dial mechanism and the connection between the dial mechanism and the speed control may be attached to the conventional instrument board. The speed of the engine is easily limited through adjustment of the knob 60.

Without further elaboration, the foregoing will so fully explain my invention that others may, by applying current knowledge, readily adapt the same for use under various conditions of service.

I claim:

1. The combination with a throttle valve, of an abutting element fixedly connected with the throttle valve, manually operated means connected with the throttle valve for actuating the same, a fixed guide member, an abutment slidably related to said guide member and arranged in the path of said abutting element, to limit the opening adjustment of the throttle valve, manually actuated means for shifting the abutment, and a screw connection between the abutment and said manually actuated means.

2. The combination with a throttle valve, of an abutting element fixedly connected with the throttle valve, manually operated means connected with the throttle valve for actuating the same, a fixedly mounted tubular guide member, an abutment slidable longitudinally inside the tubular guide member and having an end arranged in the path of said abutting element, to limit the opening adjustment of the throttle valve, means cooperable on the tubular guide member and said abutment for restraining the latter from relative rotary movement, and manually actuated means having a screw connection with said abutment for adjusting the same.

3. The combination with a throttle valve, of an abutting element fixedly connected with the throttle valve, manually operated means connected with the throttle valve for actuating the same, a fixedly mounted hollow guide member, an abutment slidably mounted in said hollow guide member and arranged in the path of said abutting element, to limit the opening adjustment of the throttle valve, and manually actuated screw means cooperating with said abutment for shifting the same.

4. The combination with a throttle valve, of an abutting element fixedly connected with the throttle valve, manually operated means connected with the throttle valve for actuating the same, an open-ended, fixedly-mounted guide, an abutment comprising a shank slidably mounted in said guide projecting through one open end of the latter and a head arranged in the path of said abutting element, to limit the opening adjustment of the throttle valve, said shank being provided with a threaded bore, and manually actuated means extending through the other open end of the guide and having threaded relation with said threaded bore for shifting the position of the head in the path of said abutting element.

5. The combination with a throttle valve, of an abutting element fixedly connected with the throttle valve, manually operated means connected with the throttle valve for actuating the same, an open-ended tubular guide fixedly mounted, an abutment slidably related to said guide and projecting beyond one end of the same to position its end in the path of said abutting element, said abutment being provided with a threaded bore, a screw operating within said threaded bore, a flexible manually actuated device fixedly connected with said screw and extending through the other open end of the guide, and a flexible housing for said flexible manually actuated device and fixedly connected with said guide.

6. The combination with a throttle valve fixedly connected with a rotatable shaft, of a first arm and a second arm fixedly connected with the shaft, manually operated means resiliently connected with said first arm for actuating the throttle valve, a guide member, an abutment slidably related to said guide member and arranged in the path of said second arm, to limit the opening adjustment of the throttle valve, and manually actuated means connected with said abutment for adjusting the same.

ROBERT J. KALBREIER.